United States Patent
Hrach et al.

(10) Patent No.: US 9,757,932 B2
(45) Date of Patent: Sep. 12, 2017

(54) DEVICE FOR HARDENING AN ELECTRICALLY CONDUCTIVE ADHESIVE

(71) Applicant: MAGNA STEYR Engineering AG & Co KG, Graz (AT)

(72) Inventors: Daniel Hrach, Raaba (AT); Franz Mayr, St. Marein bei Graz (AT)

(73) Assignee: MAGNA STEYR Engineering AG & Co KG, Graz (AT)

( * ) Notice: Subject to any disclaimer, the term of this patent is extended or adjusted under 35 U.S.C. 154(b) by 0 days.

(21) Appl. No.: 14/696,738

(22) Filed: Apr. 27, 2015

(65) Prior Publication Data

US 2015/0306863 A1 Oct. 29, 2015

(30) Foreign Application Priority Data

Apr. 29, 2014 (DE) .................. 10 2014 208 094

(51) Int. Cl.
| | | |
|---|---|---|
| *B32B 38/00* | (2006.01) | |
| *B32B 37/10* | (2006.01) | |
| *B32B 37/12* | (2006.01) | |
| *B32B 37/18* | (2006.01) | |
| *F16B 11/00* | (2006.01) | |

(52) U.S. Cl.
CPC .......... *B32B 38/0008* (2013.01); *B32B 37/10* (2013.01); *B32B 37/1284* (2013.01); *B32B 37/18* (2013.01); *F16B 11/006* (2013.01); *B32B 2307/202* (2013.01); *B32B 2605/00* (2013.01)

(58) Field of Classification Search
CPC ..... B32B 37/10; B32B 37/1284; B32B 37/18; B32B 2307/202; B32B 2605/00; B32B 38/0008; F16B 11/006
See application file for complete search history.

(56) References Cited

U.S. PATENT DOCUMENTS

| | | | | |
|---|---|---|---|---|
| 5,434,382 | A * | 7/1995 | Schlattl ................ | B23K 11/255 |
| | | | | 219/109 |
| 6,348,119 | B1 | 2/2002 | Leonte et al. | |
| 2006/0134449 | A1 | 6/2006 | Sigler et al. | |

FOREIGN PATENT DOCUMENTS

| | | |
|---|---|---|
| CN | 102470636 A | 5/2012 |
| CN | 102794557 A | 11/2012 |
| CN | 103085426 A | 5/2013 |
| DE | 4328337 C1 | 12/1994 |
| DE | 102007007617 A1 | 8/2008 |
| DE | 102008015204 A1 | 10/2008 |
| DE | 202011001607 U1 | 4/2011 |
| DE | 202011001607 U1 | 5/2011 |
| DE | 102011101751 A1 | 12/2011 |
| DE | 102013003912 A1 | 9/2013 |
| DE | 102012106378 A1 | 1/2014 |
| EP | 2314408 A1 | 4/2011 |
| GB | 737374 A | 9/1955 |

* cited by examiner

*Primary Examiner* — Vishal I Patel
(74) *Attorney, Agent, or Firm* — Jordan IP Law, LLC; Todd A. Vaughn

(57) ABSTRACT

A device for curing an electrically conductive adhesive arranged between a first component and a second component. The device includes at least one punch to both apply a compressive force onto the first component in the direction of the second component, and introduce a current into the adhesive via the components.

15 Claims, 2 Drawing Sheets

DEVICE FOR HARDENING AN ELECTRICALLY CONDUCTIVE ADHESIVE

CROSS-REFERENCE TO RELATED APPLICATIONS

The present application claims priority 35 U.S.C. §119 to German Patent Publication No. DE 10 2014 208 094.0 (filed on Apr. 29, 2014), which is hereby incorporated by reference in its entirety.

TECHNICAL FIELD

Embodiments relate to a device to cure an electrically conductive adhesive which is arranged between a first component and a second component, and a method for producing an adhesively bonded connection.

BACKGROUND

It is known to apply adhesive between two components in order to connect the components together. In particular, the use of thermosetting adhesives is known for connecting planar bodywork components, in particular, sheet metal components in the motor vehicle industry. For the rapid fixing of the bodywork components, during an adhesive bonding process, the components are generally fixed to one another by additional aids such as screws, rivets or welding, followed by a subsequent step for curing the adhesive in a furnace.

In this case, conventional adhesives require a lengthy preheating period and curing period and therefore involve time-intensive processes.

Moreover, the use of electrically conductive adhesives is disclosed in German Patent Publication No. DE 10 2013 003 912 A1. Such adhesives permit the adhesive to be cured by passing an electrical current through the adhesive. To this end, however, it is also necessary for the adhesive, in particular, an applied adhesive bead, to be accessible from the outside for introducing the current. Moreover, to this end, electrodes have to be passed into the adhesive bead which is laborious.

SUMMARY

Embodiments relate to a device for curing an electrically conductive adhesive, the device permitting the adhesive to be cured rapidly, and at the same time, being able to be applied in a simple manner by a reliable process.

Embodiments relate to a corresponding method for producing an adhesively bonded connection.

In accordance with embodiments, a device for curing an electrically conductive adhesive which is arranged between a first component and a second component, the device including at least one of: at least one punch to apply a compressive force onto the first component in a direction of the second component in a manner such that a current is able to pass into the components, and via the components, into the adhesive, via the punch as a first pole and a second pole bearing against the second component.

In accordance with embodiments, electrically conductive components, for example, metal sheets for vehicle bodywork construction, are used in order to electrically conduct current to an adhesive introduced between the components. To this end, a punch is pressed onto the first component so that the component is pressed against the adhesive and the second component, and thus, fixes the components, delivers a contact pressure for the adhesive, and is additionally used as a voltage pole for introducing a current from a voltage source into the components and thus the electrically conductive adhesive. The second pole of the voltage source, in particular, a mass point, to this end bears against the second component. By way of the current thus introduced, the adhesive is heated via the electrical power loss and a rapid curing of the adhesive takes place, in particular, without using additional temporary fastening means, and without having to come into direct contact with the adhesive from outside.

In accordance with embodiments, adhesives used here may, for example, be resins and may also, for example, have obtained their electrical conductivity by the introduction therein of metal powders or carbon powders or other electrically conductive additives such as amides or sulfides.

The current to be introduced may be an alternating current, a direct current, or even a pulsed direct current.

In accordance with embodiments, the punch comprises a temperature measuring unit. The device thus preferably comprises a unit for evaluating the temperature measurement values and for controlling or regulating the temperature or the temperature curve on the temperature measuring unit and thus on the adhesive, in order to achieve optimal curing.

In accordance with embodiments, the second pole is configured by a second punch configured to apply a compressive force onto the second component in the direction of the first component. The two punches are, therefore, pressed against one another.

In accordance with embodiments, the first punch and the second punch form parts of a pair of tongs. The device, therefore, comprises a pair of tongs having the first and second punches, so that the punches are able to be pressed onto the components in a particularly simple manner.

In accordance with embodiments, the second punch may also comprise a suitable temperature measuring unit.

In accordance with embodiments, a plurality of bonding points are present on the first component and/or the second component. One component is then used as the pole for a plurality of bonding points.

In accordance with embodiments, the second component is designed as a common mass point for at least two punches. The at least two punches then bear against the first component and may press down one or more first components.

In accordance with embodiments, the at least two punches bear against at least two different first components. The at least two punches are designed in each case to apply a compressive force onto the different first components in the direction of the second component in order to pass current into the components, and via the components, in each case into the adhesive, via the punches as the first pole and the second pole bearing against the second component.

The current may be passed via the at least two punches alternately over time, in particular, in a clocked manner. This is particularly necessary when only one common supply of energy is present for a plurality of punches electrically connected in parallel as the first pole. As different electrical contact resistances may be present at the individual bonding points, bonding points with a lower contact resistance would unnecessarily load the voltage source and/or bonding points which have a high contact resistance would not be cured or would only be cured subsequently if the current were to be passed simultaneously to the two punches via a common supply.

In accordance with embodiments, the clock ratio, i.e., the cycle for switching the current source to the different bonding points and/or punches, is determined according to the temperature or the temperature curve of the temperatures measured in the punches and/or the components.

In accordance with embodiments, the current is passed to the at least two punches independently of one another. For each punch, therefore, the energy is supplied separately and each electrical circuit of one respective punch may be regulated separately in order to achieve a desired temperature curve and curing curve at each bonding point.

It is not necessary to supply the energy in a clocked manner here, i.e., switching the energy from one punch to another.

In accordance with embodiments, a method for producing an adhesively bonded connection between a first component and a second component via an electrically conductive adhesive includes at least one of: applying, via a punch, a compressive force onto the first component in a direction of the second component in order to press the components against one another; and applying a current into the components and via the components into the adhesive, via the first punch as the first pole and a second pole bearing against the second component, so that the adhesive is heated and cured.

In accordance with embodiments, the punch comprises a temperature measuring unit and the current which is passed into the adhesive is regulated so that a specific temperature or a specific temperature curve is present in the temperature measuring unit. The current may be regulated, for example, by pulse width modulation control. If a plurality of punches are used, the current as described above may be supplied via a common electrical circuit, for example, in a clocked manner or even via a plurality of separate electrical circuits.

In accordance with embodiments, a device to cure an electrically conductive adhesive arranged between a first component and a second component, the device including at least one of: a punch to apply a compressive force onto the first component in a direction of the second component, the punch serving as a first pole of a voltage source through which a current may passed into the first component and the adhesive to cure the electrically conductive adhesive.

In accordance with embodiments, a device to cure an electrically conductive adhesive arranged between first components spaced apart from each other, and a common second component, the device including at least one of: a first punch to apply a compressive force onto a first one of the first components in a direction of the second component, the first punch serving as a first pole of a voltage source and through which a current may passed into the first component and the adhesive to cure the electrically conductive adhesive; and a second punch to apply a compressive force onto a second one of the first components in a direction of the second component, the second punch serving as a first pole of the voltage source and through which a current may passed into the first component and the adhesive to cure the electrically conductive adhesive.

In accordance with embodiments, a method for producing an adhesively bonded connection between a first component and a second component, the method including at least one of: applying an electrically conductive adhesive between the first component and the second component; and curing the electrically conductive adhesive by applying a compressive force onto the first component in the direction of the second component, and introducing a current into electrically conductive adhesive via the first component and the second component.

DRAWINGS

Embodiments will be illustrated by way of example in the drawings and explained in the description below.

DESCRIPTION

Figure 1:
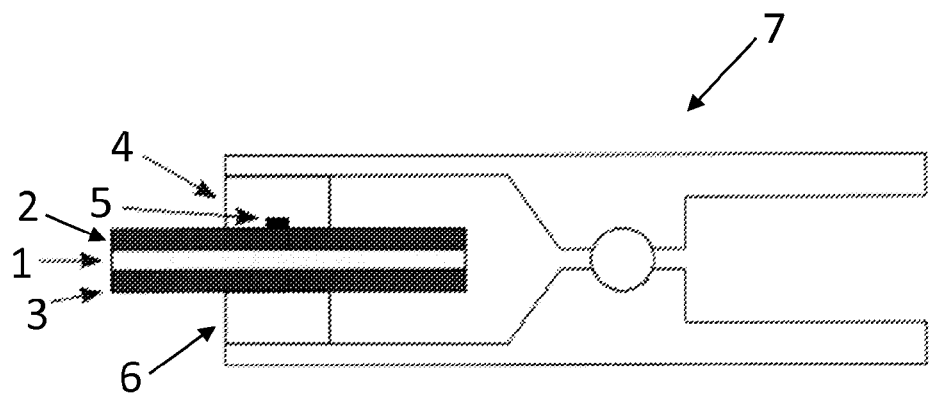
FIG. 1 illustrates a schematic side view of a device to cure an electrically conductive adhesive, in accordance with the embodiments.

As illustrated in FIG. 1, in accordance with embodiments, a device for curing an electrically conductive adhesive 1 which is arranged between an electrically conductive first component 2, such as, for example, a metal sheet, and an electrically conductive second component 3, such as, for example, a second metal sheet. The device forms a pair of tongs 7 with first and second punches 4, 6 arranged on the clamping jaws of the tongs 7. In a closed position of the tongs 7, the punches 4, 6 press from both sides onto the arrangement of the first component 2, adhesive 1, and the second component 3. This serves to press the components 2, 3 against the adhesive 1, so that the components 2, 3 are fixed and the components 2, 3 are prevented from slipping. In this case, the punches 4, 6 are additionally electrically connected to a voltage source (not illustrated), so that through the punches 4, 6 a current may be introduced into the components 2, 3 and the adhesive 1 in order to cure the adhesive.

When introducing the current, the temperature is measured by way of a temperature measuring unit 5 which is applied to the first punch 4, and which is to detect the heat produced thereby on the first component 2. The detection of the temperature and the regulation of the current supply may thereby take place automatically by a corresponding regulation unit. A possible temperature curve which is implemented by the regulation unit is illustrated in FIG. 3.

Figure 2:
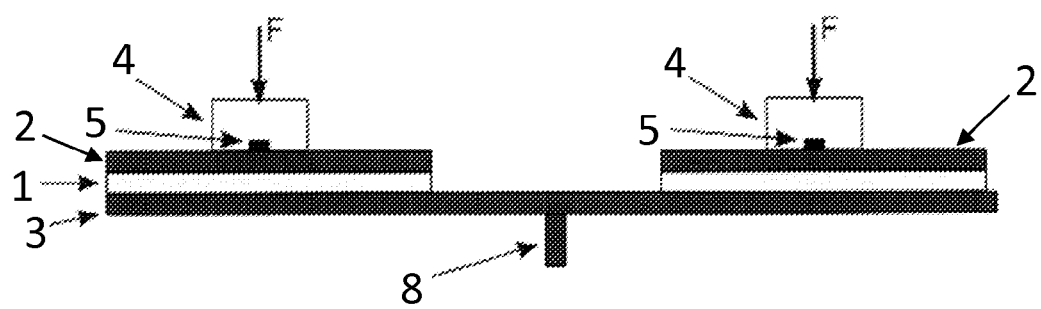
FIG. 2 illustrates a schematic side view of a device to cure an electrically conductive adhesive, in accordance with the embodiments.

As illustrated in FIG. 2, in accordance with embodiments, a device for curing an electrically conductive adhesive 1 which is arranged between electrically conductive and spaced apart first components 2, and a common second component 3 used as a common mass point for at least two punches 4. To this end, the second component 3 is connected via an electrical connection 8 to a voltage source. A second pole is in this case formed by the at least two punches 4, which in turn, press the spaced apart first components 2 with a compressive force F against the adhesive 1 at at least two bonding points, and against the common second component 3. Both punches 4 may be provided with a temperature measuring unit 5. At each bonding point, the electrical power may be regulated so that the surface temperature at each individual bonding point corresponds to a desired temperature curve.

Figure 3:
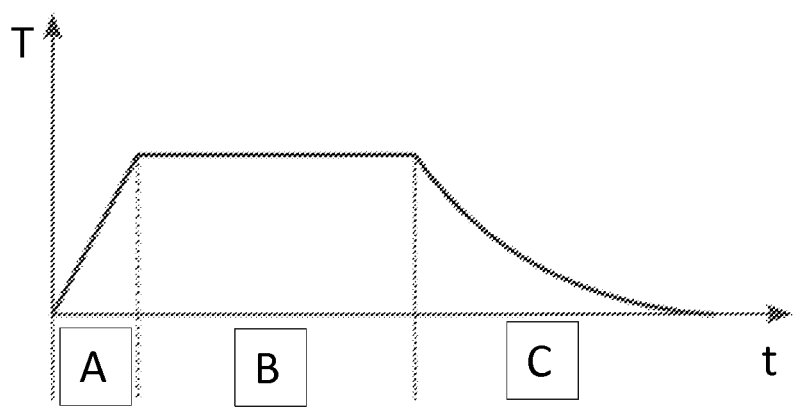
FIG. 3 illustrates a temperature curve at a bonding point in a method in accordance with the embodiments.

As illustrated in FIG. 3, a desired temperature curve at a bonding point and/or on the surface of a component 2 is provided, wherein the temperature T is indicated vertically and the time t horizontally. In each case, the temperature T may be determined via the temperature sensor(s) 5 (See FIGS. 1 and 2), and, using a control variable, electrical power may be regulated to the desired temperature curve, the respective heating curve. In the example illustrated, in a first time interval A, the bonding point is heated with a uniform gradient, for example at 50 degrees Celsius per minute. The time interval B represents a time period in which a uniform temperature T is maintained and the curing substantially takes place. At the end of the time interval B, the supply of electrical power is disconnected and the tongs opened and/or the punch(es) lifted away from the components. In the time interval C the components and the adhesive then cool. The duration of the time interval B may be varied depending on the desired degree of curing. For simple fixings, this time interval may, for example, be only one minute or a few minutes.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Adhesive
2 First component
3 Second component
4 First punch
5 Temperature measuring unit/sensor
6 Second punch
7 Pair of tongs
8 Electrical connection
F Compressive force
T Temperature axis
t Time axis
A Time interval
B Time interval
C Time interval

What is claimed is:

1. A device to cure an electrically conductive adhesive arranged between first components spaced apart from each other, and a common second component, the device comprising:
   a first punch to apply a compressive force onto a first one of the first components in a direction of the second component, the first punch serving as a first pole of a voltage source and through which a current may passed into the first one of first component and the adhesive to cure the electrically conductive adhesive; and
   a second punch to apply a compressive force onto a second one of the first components in a direction of the second component, the second punch serving as a first pole of the voltage source and through which a current may passed into the second one of first component and the adhesive to cure the electrically conductive adhesive.

2. The device of claim 1, wherein the first punch comprises a temperature measuring unit to measure a temperature of the first one of the first components.

3. The device of claim 1, wherein the second punch comprises a temperature measuring unit to measure a temperature of the second one of the first components.

4. The device of claim 1, wherein the second component is connected to a voltage source having a second pole which bears against the second component.

5. The device of claim 1, wherein the second component is used as a common mass point for the first punch and the second punch.

6. The device of claim 1, wherein the current is passed via the first punch and the second punch alternately over time in a clocked manner.

7. The device of claim 6, wherein a clock ratio is determined according to a measured temperature of the first component.

8. The device of claim 6, wherein a clock ratio is determined according to a temperature curve of measured temperatures measured in the punches and/or the components.

9. The device of claim 1, wherein current is passed to the first punch and the second punch independently of one another.

10. A device to cure an electrically conductive adhesive arranged between first components spaced apart from each other, and a common second component, the device comprising:
    a first punch to apply a compressive force onto a first one of the first components in a direction of the second component, the first punch serving as a first pole of a voltage source and through which a current may passed into the first one of first component and the adhesive to cure the electrically conductive adhesive, the first punch including a first temperature measuring unit to measure a temperature of the first one of the first components; and
    a second punch to apply a compressive force onto a second one of the first components in a direction of the second component, the second punch serving as a first pole of the voltage source and through which a current may passed into the second one of first component and the adhesive to cure the electrically conductive adhesive, the second punch including a temperature second measuring unit to measure a temperature of the second one of the first components.

11. The device of claim 10, wherein the current is passed via the first punch and the second punch alternately over time in a clocked manner.

12. The device of claim 11, wherein a clock ratio is determined according to a measured temperature of the first component.

13. The device of claim 11, wherein a clock ratio is determined according to a temperature curve of measured temperatures measured in the first punch and the second punch and/or the first component and the second component.

14. The device of claim 10, wherein current is passed to the first punch and the second punch independently of one another.

15. A device to cure an electrically conductive adhesive arranged between first components spaced apart from each other, and a common second component, the device comprising:
    a first punch to apply a compressive force onto a first one of the first components in a direction of the second component, the first punch serving as a first pole of a voltage source and through which a current may passed into the first one of first component and the adhesive to cure the electrically conductive adhesive; and
    a second punch to apply a compressive force onto a second one of the first components in a direction of the second component, the second punch serving as a first pole of the voltage source and through which a current may passed into the second one of first component and the adhesive to cure the electrically conductive adhesive, wherein at least one of the first punch and the second punch comprises a temperature measuring unit to measure a temperature of one of the first component and the second component.

* * * * *